(12) United States Patent
Shimabukuro et al.

(10) Patent No.: US 6,638,022 B2
(45) Date of Patent: Oct. 28, 2003

(54) HYBRID VEHICLE CONTROL DEVICE

(75) Inventors: Eijirou Shimabukuro, Wako (JP);
Shigeru Ibaraki, Wako (JP); Takuya Shirasaka, Wako (JP); Makoto Kishida, Wako (JP); Yutaka Tamagawa, Wako (JP); Tetsuya Hasebe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 510 days.

(21) Appl. No.: 09/754,252

(22) Filed: Jan. 5, 2001

(65) Prior Publication Data

US 2001/0016165 A1 Aug. 23, 2001

(30) Foreign Application Priority Data

Jan. 17, 2000 (JP) ........................................ 2000-007339
Jan. 24, 2000 (JP) ........................................ 2000-014406

(51) Int. Cl.[7] ................................................ F04B 41/06
(52) U.S. Cl. ............................................................ 417/2
(58) Field of Search .................................. 417/2, 3, 4, 5, 417/6, 7, 8

(56) References Cited

U.S. PATENT DOCUMENTS

| | | | | |
|---|---|---|---|---|
| 3,584,977 A | * | 6/1971 | Coleman et al. | 417/53 |
| 4,204,808 A | * | 5/1980 | Reese et al. | 417/2 |
| 4,547,128 A | * | 10/1985 | Hayes | 417/2 |
| 4,655,688 A | * | 4/1987 | Bohn et al. | 417/18 |
| 4,666,374 A | * | 5/1987 | Nelson | 417/3 |

FOREIGN PATENT DOCUMENTS

JP    A-11-132321    5/1999

* cited by examiner

Primary Examiner—Daniel Robinson
(74) Attorney, Agent, or Firm—Arent Fox Kintner Plotkin & Kahn, PLLC

(57) ABSTRACT

A hybrid vehicle includes: a metal V-belt type infinitely variable gear-change mechanism 20 whereby the rotation of an engine E is subjected to change in gear ratio, a forwards clutch 14 and a reverse brake 15 that perform engagement/disengagement control of the engine and the infinitely variable gear-change mechanism, and a second motor generator 50 capable of driving the drive wheels arranged parallel with the engine. The control device is provided with a first hydraulic pump 3 for engine drive, a second hydraulic pump 56 that is driven by an electric motor 55 for pump drive, and a forwards/reverse clutch control valve 73 that performs changeover control of supply of working hydraulic pressure to the forwards clutch 14 etc. When vehicle running is performed with the engine stopped, the forwards clutch etc is disengaged by the forwards/reverse clutch control valve, and the second hydraulic pump is driven by the electric motor for pump drive, gear-change control of the infinitely variable gear-change mechanism being performed in accordance with the current driving conditions by using this hydraulic pressure.

4 Claims, 14 Drawing Sheets

HYBRID VEHICLE CONTROL DEVICE

FIELD OF THE INVENTION

The present invention relates to a hybrid vehicle constructed so that running drive can be effected by transmitting engine output through a gear-change mechanism to the vehicle and running drive is also possible by means of a drive motor that is arranged in parallel with the engine, so that, in prescribed operating conditions, the engine may be temporarily stopped and running drive may be performed by driving the vehicle by means of the drive motor.

BACKGROUND OF THE INVENTION

Efforts are being made to put into practice hybrid vehicles wherein running can be performed using engine drive and electric motor drive in combination, with the object of improving engine fuel consumption etc. Such a hybrid vehicle is disclosed for example in Laid-open Japanese Patent Application Number H. 11-132321. This vehicle comprises an engine, a first motor generator connected to the engine crankshaft, a belt type infinitely variable gear-change mechanism connected to the engine output shaft through a torque converter, and a second motor generator connected to a power transmission system on the output side of this infinitely variable gear-change mechanism. This vehicle is arranged such that ordinary running is performed by converting the gear ratio of the engine driving force in the infinitely variable gear-change mechanism before transmitting it to the vehicle wheels; when the vehicle is temporarily stopped, the engine is also temporarily stopped; and when subsequently the vehicle is made to move off, the vehicle wheels are driven by a second motor generator. It should be noted that, when the vehicle is thus made to move off again, the engine is restarted by the first motor generator, and after the vehicle has moved off a changeover is effected to running using engine drive.

If the engine is thus stopped when the vehicle is temporarily stopped, hydraulic pump drive by the engine is also stopped, causing the hydraulic pressure of the infinitely variable gear-change mechanism to be lost. Accordingly, a second hydraulic pump is provided that is driven by an electric motor and when the engine is stopped a prescribed hydraulic pressure is generated by driving the second hydraulic pump by means of this electric motor so as to prepare for the next move-off in a condition with the gear ratio set to the maximum (LOW) to enable motive force transmission, by supplying this prescribed hydraulic pressure to the output pulley cylinder chamber of the infinitely variable gear-change mechanism. In this way, in a hybrid vehicle as described above, an improvement is sought to be achieved in respect of fuel costs by stopping the engine when the vehicle is temporarily stopped, and an improvement in respect of fuel costs is sought to be achieved by driving the vehicle wheels using the second motor generator on moving off.

Consideration has also been given, with the object of further improving the fuel consumption, to stopping the engine and performing running using the electric motor drive also when the vehicle is running at comparatively high speed. If in this case the conventional hybrid vehicle control described above is employed without modification, the following problems arise.

Conventionally, when the engine was stopped in a condition where the vehicle was temporarily stopped, it was arranged for the clutch, which is provided in the power transmission system, to be prepared for the next move-off by being in an engaged condition, by hydraulic fluid pressure supplied from the second hydraulic fluid pump during the engine stoppage. However, if the clutch is put in engaged condition when the engine is stopped during running, the problem arises that the gear-change mechanism and the torque converter are rotated by the driving force from the vehicle wheels, generating entrainment torque, necessitating additional driving torque from the electric motor, thereby lowering the drive efficiency.

Also, conventionally, the arrangement was such that, when the engine was stopped on temporary stoppage of the vehicle, the next move-off was prepared for in a condition with transmission of motive force being made possible by setting the gear ratio to the maximum (LOW), by supplying hydraulic fluid, supplied from the second hydraulic fluid pump, to the output pulley cylinder chamber of the infinitely variable gear-change mechanism. However, there was the problem that, if the engine was stopped during running and running drive effected using the electric motor, since control was performed such as to make the gear ratio the maximum (LOW), on return from electric motor drive to engine drive during running, since the gear ratio was the maximum (LOW) for the current vehicle speed, the engine speed had to be raised unnecessarily, impairing fuel consumption and drivability.

Accordingly, the present applicants gave consideration to performing gear ratio control such that the gear ratio of the infinitely variable gear-change mechanism should have a value corresponding to the current operating condition, by using hydraulic pressure obtained by driving the second hydraulic pump by the electric motor when running was performed with the engine stopped.

However, when the engine is temporarily stopped as described above, for reasons relating to battery capacity etc it is demanded to make the electric power consumption of the electric motor that drives the second hydraulic pump as small as possible; also, the delivery capacity of the second hydraulic pump is made as small as possible and the hydraulic pressure for gear ratio control is also made as low as possible. However, when gear-change control is performed using such a miniaturized second hydraulic pump, there is the problem that the rate at which gear change can be achieved is limited; for example in the case of sudden braking action whilst running, resulting in abrupt deceleration and stopping, gear change control in a manner such as to track this cannot be achieved i.e. gear change control displays a time-lag.

Specifically, for example, in a case where brake action is performed when running at comparatively high speed in a condition with the gear ratio close to the minimum (TOP), causing abrupt deceleration and stopping the vehicle, gear-change control is demanded whereby the gear ratio can be changed to the maximum (LOW) in the short time that elapses before the vehicle is thus abruptly stopped. However, since, as described above, the rate of gear-change that is achievable is reduced by miniaturizing the second hydraulic pump, the condition is generated that the gear ratio is left at an intermediate value, since the gear ratio has not been able to return to the maximum (LOW) by the time the vehicle has stopped, owing to the gear-change control lag.

In this situation, typically control is effected such that the engine is stopped when the vehicle is stopped, with the object of improving the fuel consumption; consequently, when the vehicle stops, the engine is stopped and the gear ratio remains at an intermediate gear ratio; thus, there is the problem that when the engine is started and the vehicle moves off moving-off control must be effected from an intermediate gear ratio, with the consequence that sufficient moving-off driving force is not obtained. Also, if, in order to obtain sufficient driving force, the gear ratio is returned to the maximum (LOW) before moving-off control is exercised, there is the problem that moving off is delayed, impairing drivability.

SUMMARY OF THE INVENTION

An object of the present invention is to provide a hybrid vehicle control device constructed such that fuel consumption and running performance are not impaired even when performing running drive wherein the engine is stopped and an electric motor is used during running at comparatively high speed.

A further object of the present invention is to provide a hybrid vehicle control device constructed such that it can cope with such gear-change requests even when abrupt gear-change requests are generated by for example abrupt deceleration during running with the engine stopped.

Yet a further object of the present invention is to provide a hybrid vehicle control device constructed such that miniaturization and weight reduction of the hydraulic pump that is driven by the electric motor during engine stoppage can be achieved.

According to the present invention, a hybrid vehicle is constituted comprising: an engine that is capable of temporary stoppage control in a prescribed operating condition, an infinitely variable gear-change mechanism (for example metal V-belt type infinitely variable gear-change mechanism 20) connected to the output shaft of this engine and whereby the output rotation thereof is subjected to infinitely variable change of gear ratio, means for control of engagement/disengagement (for example forwards clutch 14 and reverse brake 15) that perform this engagement/disengagement control using hydraulic force and that are arranged so as to be capable of engagement/disengagement between the engine output shaft and an input member of the infinitely variable gear-change mechanism, a driving force transmission system (for example, idler shaft 31, final drive gear 32, final driven gear 33, differential mechanism 34, and axle shafts 35 etc) that transmits the output of the infinitely variable gear-change mechanism to the drive wheels, and an electrically driven motor (for example second motor generator 50) capable of driving the drive wheels by being connected to this driving force transmission system, in which this control device further comprises: a first hydraulic pump that is driven by the engine; and a second hydraulic pump that is driven by an electric motor for pump drive, and a hydraulic pressure supply changeover control valve (for example, forward/reverse clutch control valve 73) that effects changeover control of supply of working hydraulic fluid in respect of the means for engagement/disengagement control. When performing running drive with the drive wheels driven by the engine, gear-change control is executed by the infinitely variable gear-change mechanism by means of hydraulic pressure from the first hydraulic pump. On the other hand, when the vehicle is being run with the drive wheels driven by the electrically driven motor and with the engine stopped in a prescribed operating condition, the means for engagement/disengagement control are released by stopping the supply of working hydraulic pressure to the means for engagement/disengagement control by using the hydraulic pressure supply changeover control valve, so that the second hydraulic pump is driven by the electric motor for pump drive and gear-change control is executed such that the gear ratio of the infinitely variable gear-change mechanism is made to have a value matching the current driving conditions, using the hydraulic pressure obtained from the second hydraulic pump.

If a control device of such a construction is employed, when the engine is temporarily stopped on the occurrence of a prescribed operating condition during running etc at comparatively high speed, supply of working hydraulic pressure to the means for engagement/disengagement is stopped, thereby releasing this, so, in drive of the vehicle wheels by the electrically driven motor, any possibility of occurrence of entrainment torque trying to rotate the power transmission device located on the engine side of the means for engagement/disengagement is eliminated, thereby improving drive efficiency. Also, when running is thus effected by the electrically driven motor on temporary stoppage of the engine, gear-change control of the infinitely variable gear-change mechanism is performed using hydraulic pressure obtained by the second hydraulic pump, so a gear ratio suitable for the running conditions at that time point is always set, and, subsequently, smooth changeover to engine drive from running drive using the electrically driven motor can be effected by restarting the engine, thereby enabling the fuel consumption and drivability to be improved.

According to a further aspect of the present invention, a hybrid vehicle is constituted comprising: an engine that is capable of temporary stoppage control in a prescribed operating condition, an infinitely variable gear-change mechanism connected to the output shaft of this engine and whereby the output rotation thereof is subjected to infinitely variable change of gear ratio, a drive force transmission system that transmits the output of the infinitely variable gear-change mechanism to the driven wheels, and an electrically driven motor (for example second motor generator 50) that is capable of driving the driven wheels and is arranged parallel with the engine, in which the control device further comprises a first hydraulic pump driven by the engine and a second hydraulic pump driven by an electric motor for pump drive. With this control device, in a prescribed driving condition, in running with the engine stopped, gear-change control is performed such that the gear ratio of the infinitely variable gear-change mechanism assumes a value matching the current driving conditions, using the hydraulic pressure obtained from the second hydraulic pump, the second hydraulic pump being driven by the electric motor for pump drive, and furthermore, when there is a request for a large gear-change that cannot be coped with by gear-change control using hydraulic pressure obtained from the second pump, the engine is started and the first hydraulic pump is driven, so that the hydraulic pressure obtained from this first hydraulic pump is used for gear-change control.

The control device may further comprise means for discrimination that compare the requested rate of gear-change requested in accordance with driving conditions with the maximum rate of gear-change that can be obtained by hydraulic pressure supplied from the second hydraulic pump, and which, if it is concluded by the means for discrimination that the requested rate of gear-change is larger than the maximum rate of gear-change, cause the first hydraulic pump to be driven by starting the engine. For example, the engine stoppage permission cancellation decision processing control shown in FIG. 10 may be referred to.

Using such a control device according to the present invention, when a request for an abrupt gear-change is generated by for example abrupt braking action during running with the engine temporarily stopped, the engine is restarted and the hydraulic pressure from the first hydraulic pump is employed for gear-change control, so even if the second hydraulic pump is miniaturized, it is possible to cope with a request for an abrupt gear-change. The second hydraulic pump can therefore be miniaturized and reduced in weight and, in addition, the electric motor that drives the second hydraulic pump can be miniaturized and its power consumption kept to a minimum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
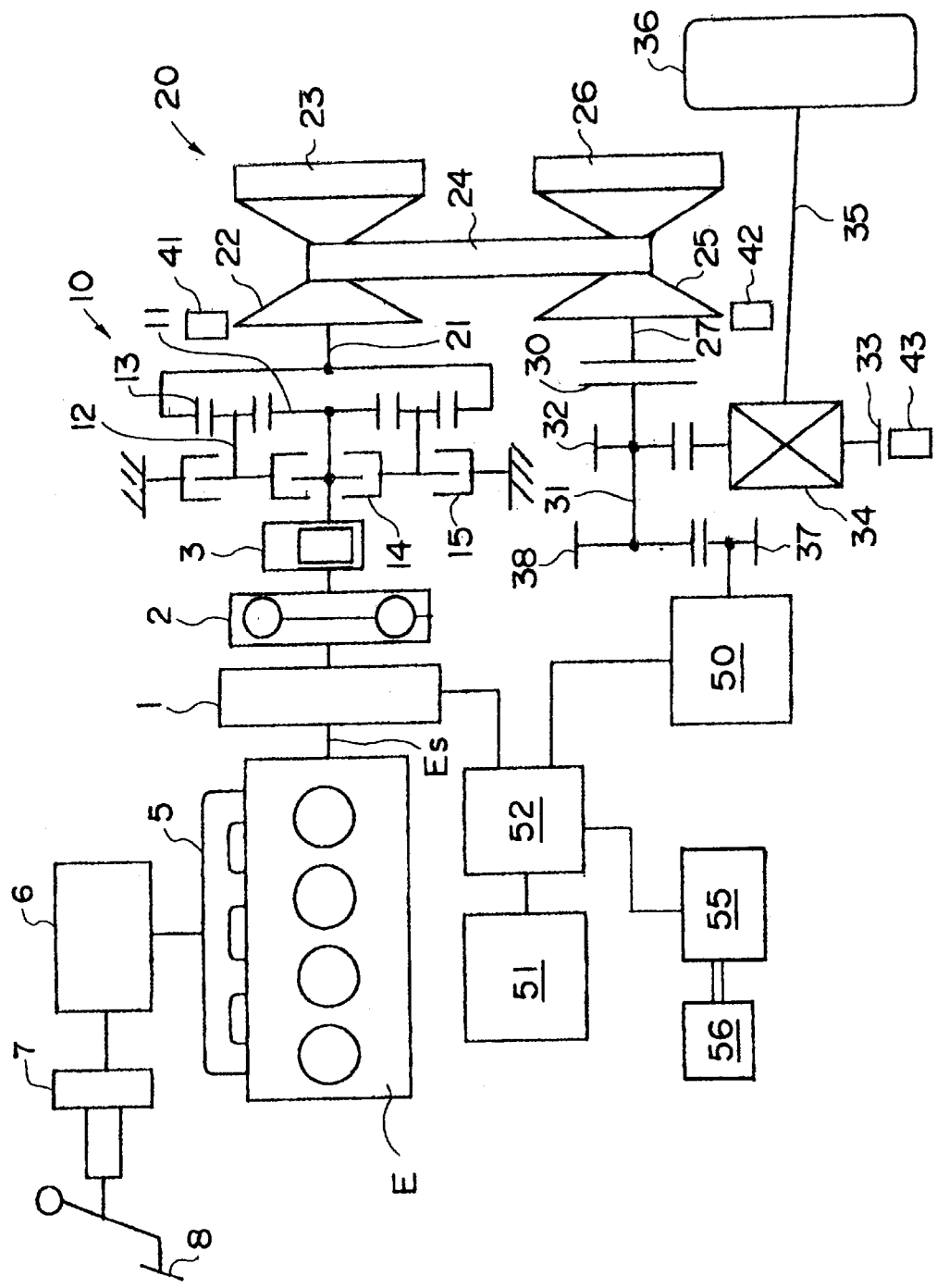
FIG. 1 is a schematic diagram illustrating the layout of the power transmission device of a hybrid vehicle according to the present invention.

Preferred embodiments of the present invention are described below with reference to the drawings. FIG. 1 shows the layout of a power transmission device for a hybrid vehicle provided with a control device according to the present invention. This power transmission device is employed for ordinary running drive and is provided with an engine E capable of temporary stoppage control. A vacuum tank 6 is provided that accumulates negative pressure by extracting negative pressure from suction pipe 5 of this engine E; the negative pressure of vacuum tank 6 is supplied to brake booster 8, multiplying the operating force of brake pedal 8 in performing brake operation.

The first motor generator 1 is provided on the output shaft Es of engine E; this first motor generator 1 performs starting drive of engine E and engine drive assistance etc when moving off, and also performs energy regeneration by being used as a generator during deceleration. The output shaft Es of engine E is coupled with forwards/reverse changeover mechanism 10 through a damper mechanism 2. A first hydraulic pump 3 is driven by engine E, this first hydraulic pump 3 being provided on this engine output shaft Es.

Forwards/reverse changeover mechanism 10 comprises a single pinion type planetary gear having a sun gear 11 coupled with engine output shaft Es through dumper mechanism 2, a carrier 12 that freely rotatably supports the pinion gear arranged meshing therewith at the periphery of sun gear 11 and which is freely rotatably arranged coaxially with sun gear 11, and ring gear 13 that is freely rotatably arranged coaxially with sun gear 11, meshing with the pinion gear, and which is linked with the gear-change mechanism input shaft 21, and is further provided with a forwards clutch 14 capable of connecting and disconnecting carrier 12 and sun gear 11 (or engine output shaft Es), and a reverse brake 15 capable of fixing and holding carrier 12. Consequently, when forwards clutch 14 is engaged, the entire planetary gear performs the same rotation as engine output shaft Es, and gear-change mechanism input shaft 21 is driven in rotation forwards. On the other hand, when reverse brake 15 is engaged, ring gear 13 is rotated in the opposite direction with respect to engine output shaft Es, causing gear-change mechanism input shaft 21 to be rotated in the vehicle reversing direction. It should be noted that if forwards clutch 14 and reverse brake 15 are both released, engine output shaft Es and gear-change mechanism input shaft 21 are disconnected.

A metal V belt type infinitely variable gear-change mechanism 20 is constructed having a gear-change mechanism input shaft 21; rotation of gear-change mechanism input shaft 21 which is driven in rotation as described above is subjected to an infinitely variable change in gear ratio by infinitely variable gear-change mechanism 20 and transmitted to gear-change mechanism output shaft 27. Infinitely variable gear-change mechanism 20 comprises a drive pulley 22 whose pulley width is capable of being variably adjusted by means of drive-side hydraulic cylinder 23, driven pulley 25 whose pulley width is capable of being variably adjusted by means of driven-side hydraulic cylinder 26, and a metal V belt 24 that is provided between the two pulleys 22 and 25. Drive pulley 22 is connected to gear-change mechanism input shaft 21 and driven pulley 25 is connected to gear-change mechanism output shaft 27. Consequently, rotation of gear-change mechanism input shaft 21 can be transmitted to gear-change mechanism output shaft 27 with an infinitely variable gear ratio, by controlling the hydraulic pressure that is supplied to the drive and driven side hydraulic cylinders 23 and 26.

Moving-off clutch 30 is connected to gear-change mechanism output shaft 27. Moving-off clutch 30 comprises a clutch of the hydraulically actuated type and engagement control of moving-off clutch 30 is performed by control of the actuating hydraulic pressure. An idler shaft 31 that is coupled with a gear-change mechanism input shaft 27 through moving-off clutch 30 is freely rotatably arranged; a final drive gear 32 that is arranged coupled with idler shaft 31 meshes with a final driven gear 33 incorporating a differential mechanism 34. Differential mechanism 34 is coupled with the left and right vehicle wheels 36 through left and right axle shafts 34 (only the right hand ones are shown in the Figure).

A motor-side driven gear 38 is arranged coupled with idler shaft 31 and meshes with motor-side drive gear 37 which is arranged coupled with the rotary shaft of a second motor generator 50. Consequently, the left and right vehicle wheels 36 can be driven from idler shaft 31 by means of second motor generator 50 and, contrariwise, using this as a generator, energy regeneration can be performed by this being rotated by receiving drive force from vehicle wheels 36.

The first and second motor generators 3, 50 are connected to battery 51 through power drive unit 52. In this way, these motor generators 3, 50 can be driven by supplying power from battery 51, or the battery can be charged (i.e. energy regeneration performed) by the power obtained by making these motor generators 3, 50 act as generators when they are driven in rotation.

Also, an electric motor 55 for pump drive is connected to power drive unit 52 and a second hydraulic pump 56 is connected to the rotary drive shaft of this electric motor for pump drive 55. The second hydraulic pump 56 can therefore be driven by driving electric motor for pump drive 55 by the power from battery 51.

In the power transmission device constructed as above, the output of engine E or the output of first motor generator 1 is transmitted through forwards/reverse changeover mechanism 10 to infinitely variable gear-change mechanism 20, where the transmission ratio is changed, after which transmission control is performed by moving-off clutch 30 and, further, is transmitted to the left and right vehicle wheels 36 through differential mechanism 34 etc. In this way, vehicle running drive is performed by engine E or first motor generator 1. When first motor generator 1 is driven in rotation by the vehicle wheels 36 as for example during decelerating running, this acts as a generator so that energy regeneration is thereby performed. On the other hand, the output of the second motor generator 50 is transmitted to the left and right vehicle wheels 36 through differential mechanism 34 etc from idler shaft 31. In this case also, when the second motor generator 50 is driven in rotation by vehicle wheels 36, this acts as a generator so that energy regeneration is performed.

As will be clear from the above construction, in running drive control, engagement control of the forward clutch 14 and reverse brake 15, gear-change control performed by pulley width adjustment of the drive and driven pulleys 22 and 25 by the drive side and driven-side hydraulic cylinders 23 and 26, and engagement control of the moving-off clutch 30 are required. In order to achieve such control etc, there are provided a first rotation sensor 41 that detects rotation of the gear-change mechanism input shaft 21 (drive pulley 22), a second rotation sensor 42 that detects rotation of the gear-change mechanism output shaft 27 (driven pulley 25) and a third rotation sensor 43 that detects rotation (i.e. vehicle speed) of the final driven gear 33.

Figure 2:
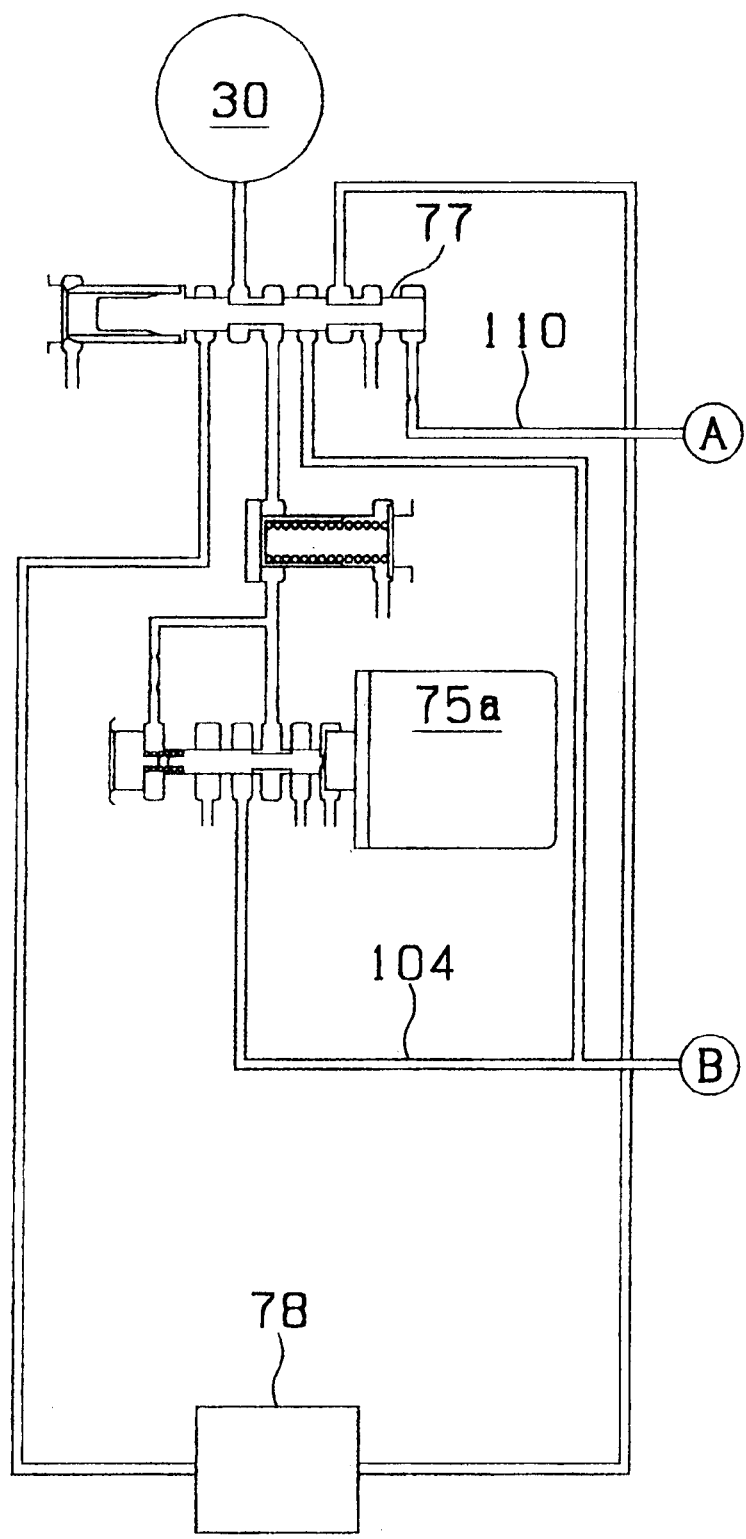
FIG. 2 to FIG. 4 are hydraulic circuit diagrams illustrating the layout of a device for performing control of operation in the above power transmission device.
Figure 3:
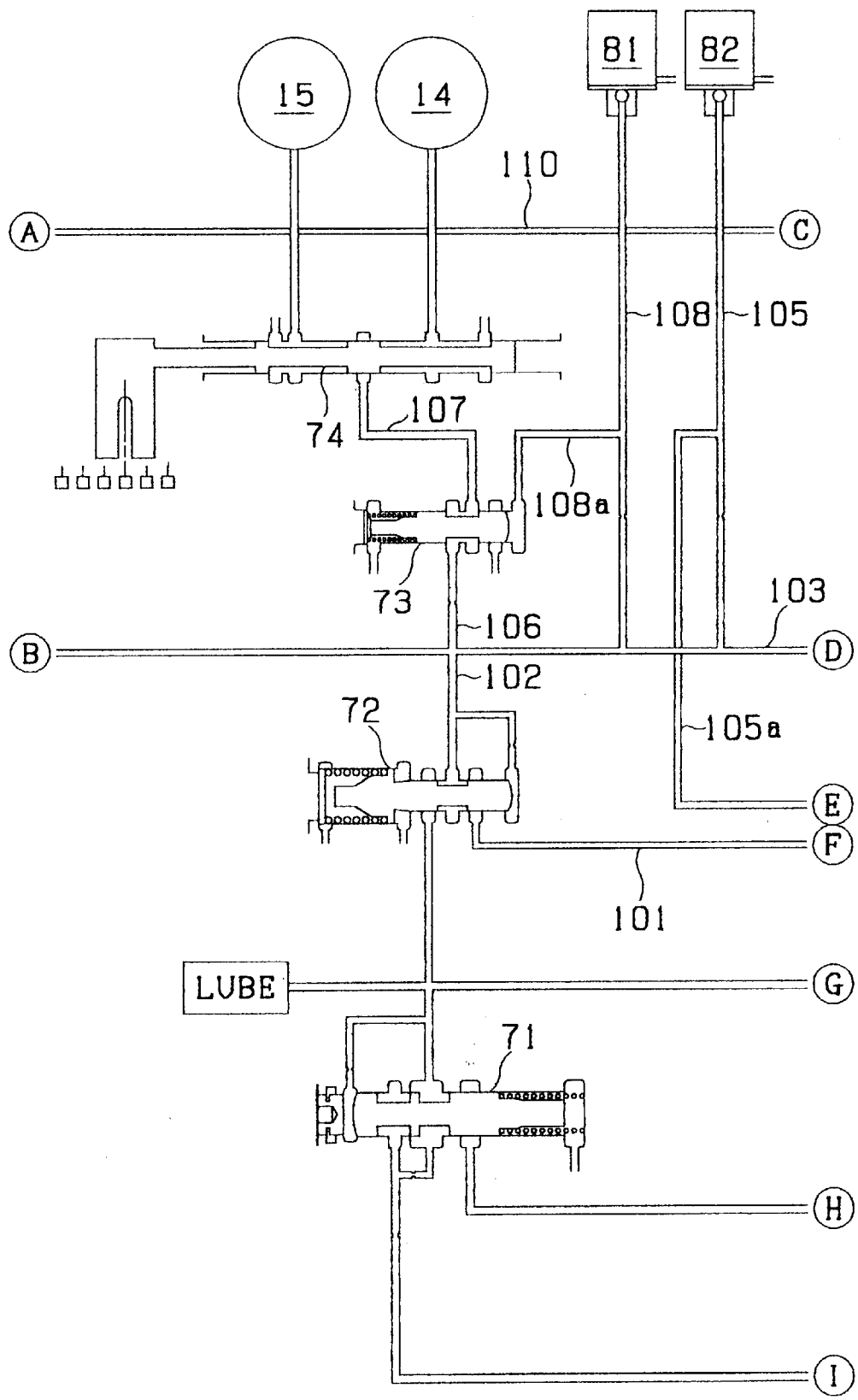
Figure 4:
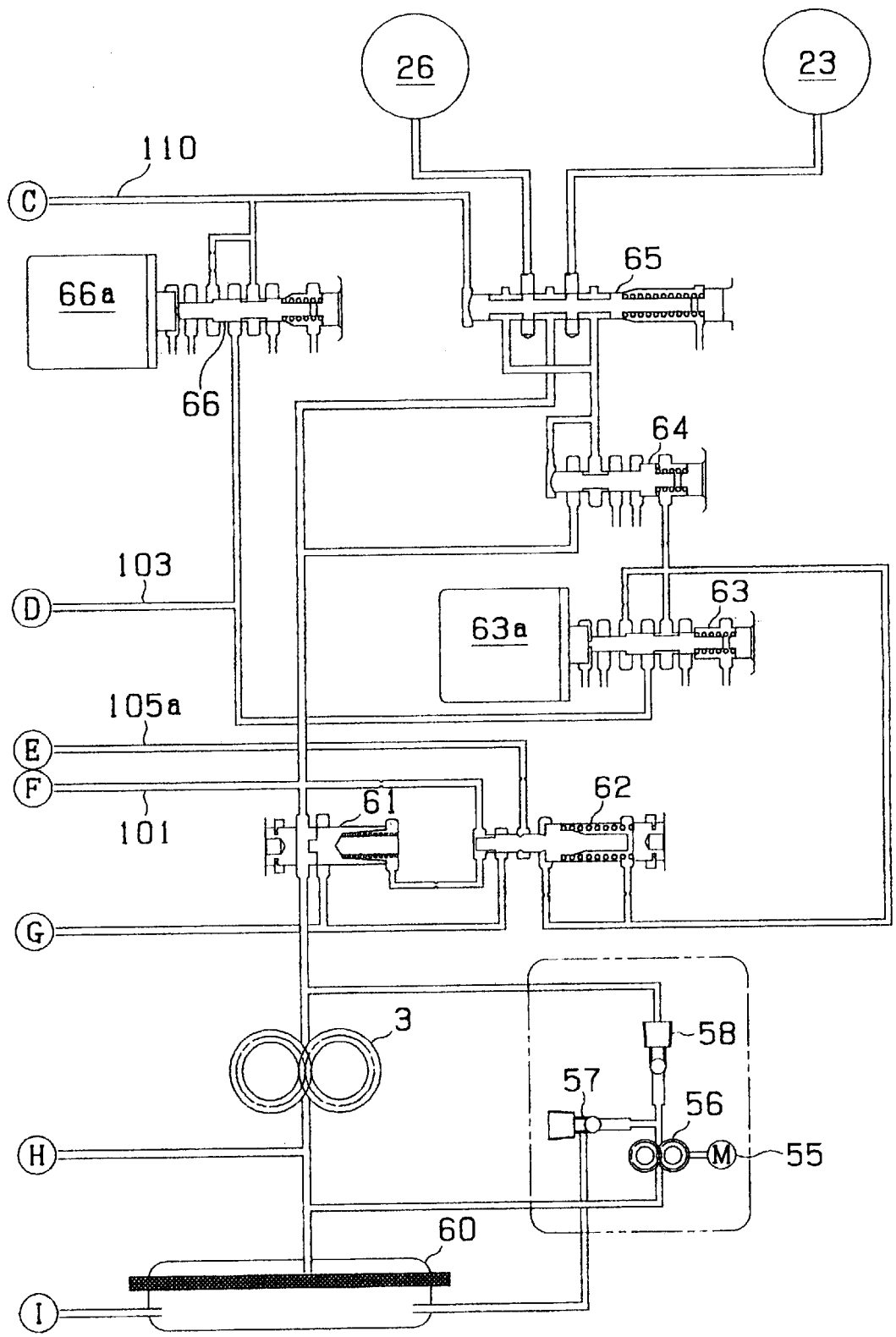
Figure 5:
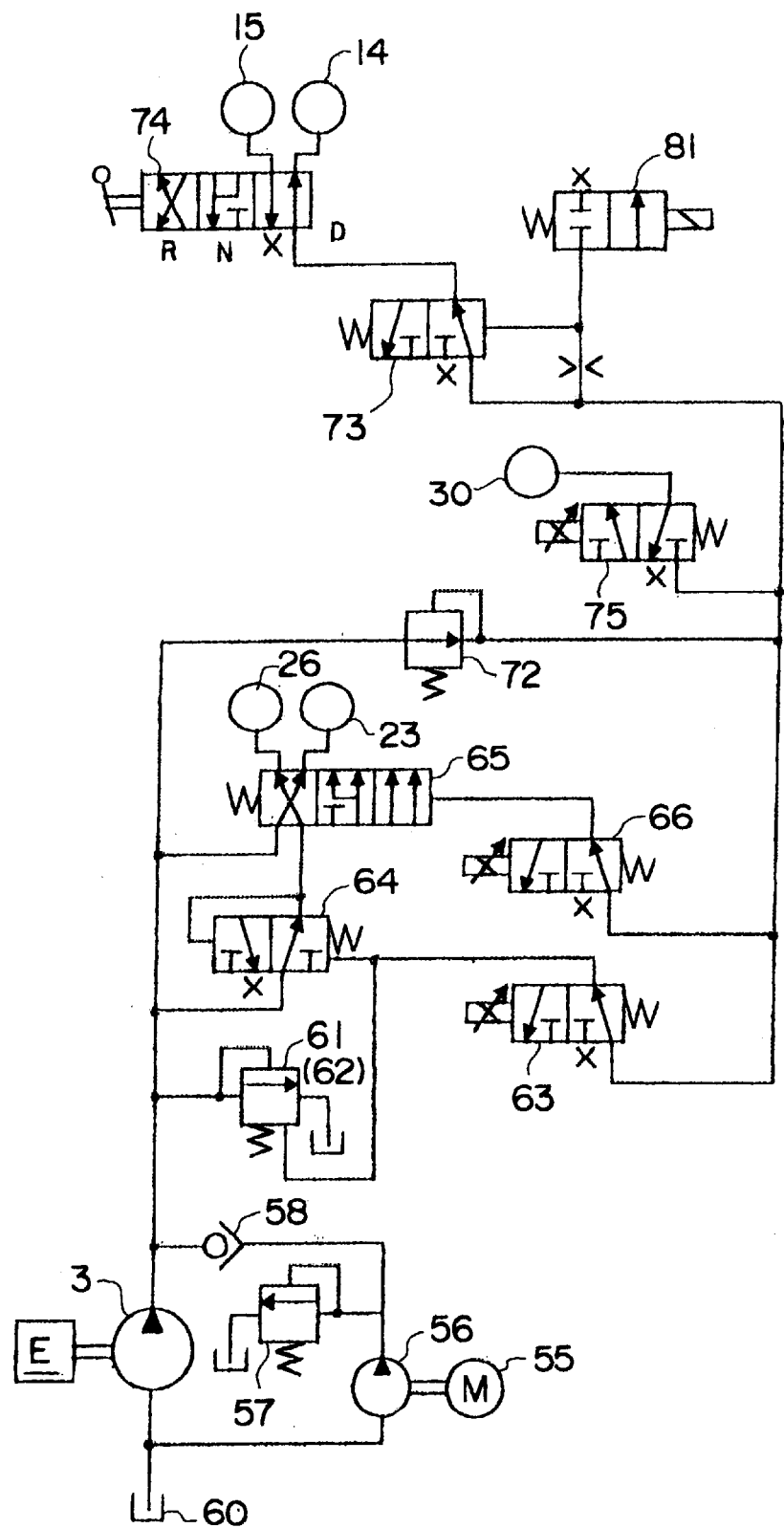
FIG. 5 is a schematic view of a hydraulic circuit illustrating the layout of a device for performing operation control in the above power transmission device.

These control actions are performed by using the hydraulic pressure supplied from first hydraulic pump 3 or second hydraulic pump 56. The construction of the hydraulic control device that performs these control actions is described below with reference to the hydraulic circuit diagrams of FIG. 2 to FIG. 4 and the hydraulic circuit schematic view of FIG. 5. In these Figures, the hydraulic circuits indicated by the circled letters of the alphabet A to I are mutually connected.

This hydraulic control device comprises a first hydraulic pump 3 and second hydraulic pump 56 that deliver working hydraulic fluid in oil tank 60 formed by the gear-change mechanism housing etc. As described above, first hydraulic pump 3 is driven by engine E and second hydraulic pump 56 is driven by electric motor for pump drive 55. A relief valve 57 and one-way valve at 58 are provided on the discharge hydraulic fluid path of the second hydraulic pump 56 driven by electric motor for pump drive 55. A high hydraulic pressure for control purposes is created by adjusting the pressure of the hydraulic fluid discharged by the two hydraulic pumps 3, 56 by means of high pressure regulator valve 61, and this high hydraulic pressure for control purposes is supplied to a shift valve 65 and low-pressure regulator valve 64. A low hydraulic pressure for control purposes created by pressure adjustment by low-pressure regulator valve 64 is also supplied to shift valve 65.

High-pressure regulator valve 61 creates a high hydraulic pressure for control purposes in accordance with the back pressure from high-pressure control valve 62 and the operation of high-pressure control valve 62 and low-pressure regulator valve 64 is controlled by the hydraulic pressure for control purposes from high/low pressure control valve 63. High/low pressure control valve 63 creates an arbitrary hydraulic pressure for control purposes in accordance with the control current by means of linear solenoid 63a; as can be understood from this, a high hydraulic pressure for control purposes and a low hydraulic pressure for control purposes are set by signal current control of linear solenoid 63a of the high/low-pressure control valve 63.

Shift valve 65 supplies in distributed fashion high pressure hydraulic fluid for control purposes and low-pressure hydraulic fluid for control purposes supplied as described above to drive- and driven-side hydraulic cylinders 23 and 26 so as to effect gear ratio control by pulley width adjustment of the drive and driven pulleys 22 and 25. The operation of this shift valve 65 is controlled by shift control hydraulic pressure from a shift control valve 66 actuated by linear solenoid 66a. Specifically, gear ratio control can be performed by controlling the operation of shift valve 65 by performing signal current control of linear solenoid 66a.

The high hydraulic pressure for control purposes created by high pressure control valve 61 is supplied to clutch reducing valve 72 from hydraulic fluid path 101, creating line pressure, which line pressure is supplied to hydraulic fluid path 102. The excess hydraulic fluid that is evacuated from high-pressure regulator valve 61, high-pressure control valve 62, and clutch reducing valve 72 is adjusted in pressure by lubricating valve 71 and supplied to lubricating section LUBE. The line pressure of the hydraulic fluid path 102 is supplied from hydraulic fluid path 103 to high/low pressure control valve 63 and shift control valve 66 and furthermore is supplied from hydraulic fluid paths 104, 104a to a moving-off clutch control valve 75, to be described.

The line pressure of hydraulic fluid path 102 is supplied through hydraulic fluid path 105 to high pressure control solenoid valve 82 and is supplied through hydraulic fluid path 105a to high pressure control valve 62. As a result, it is possible to change over the setting of the high-pressure hydraulic fluid for control purposes between two levels, by performing changeover control of supply of line pressure to the high pressure control valve 62 by using high-pressure control solenoid valve 82.

The line pressure of hydraulic fluid path 102 is further supplied from hydraulic fluid path 106 through forwards/reverse clutch control valve 73 to hydraulic fluid path 107 and furthermore is arranged to be selectively supplied through manual valve 74 to forward clutch 14 and reverse brake 15. When forwards/reverse clutch control valve 73 is subjected to line pressure from hydraulic fluid path 108a at its right-hand end, its spool is moved to the left as shown in the Figure, effecting communication of hydraulic fluid path 106 and hydraulic fluid path 107; when the line pressure disappears, the spool is moved to the right, cutting off hydraulic fluid path 107 from hydraulic fluid path 106 and connecting hydraulic fluid path 107 with the drain. The action of the line pressure on hydraulic fluid path 108a is controlled by forwards/reverse clutch control solenoid valve 81 which is connected through hydraulic fluid path 108 from hydraulic fluid path 102.

Manual valve 74 performs a changeover action in response to operation of the gear shift lever at the driver's seat whereby it blocks hydraulic fluid path 107 in ranges P and N and connects both the forward clutch 14 and reverse brake 15 to the drain, thereby releasing the forward clutch 14 and reverse brake 15. In range R, it connects reverse brake 15 with the hydraulic fluid path 107, so that line pressure is supplied to the reverse brake 15, which is thereby engaged. And in the forward drive ranges i.e. D, S, and L ranges, it connects hydraulic fluid path 107 with forward clutch 14, causing line pressure to be supplied to the forward clutch, which is thereby engaged. However, when hydraulic fluid path 106 and hydraulic fluid path 107 are in a connected condition due to receipt of line pressure from hydraulic fluid path 108a at the right-hand end of forwards/reverse clutch control valve 73, although engagement operation of forwards/reverse clutch 14 or reverse brake 15 is possible as described above, if no line pressure is acting on hydraulic fluid path 108a, hydraulic fluid path 107 is connected to the drain by forwards/reverse clutch control valve 73, with the result that forward clutch 14 and reverse brake 15 are released irrespective of the position into which the manual valve 74 has been moved.

As described above, the operation of moving-off clutch control valve 75 that is supplied with line pressure through hydraulic fluid path 104 is controlled by linear solenoid 75a, causing moving-off clutch control hydraulic pressure to be supplied to moving-off clutch 30 through shift inhibitor valve 77, thereby performing engagement control of moving-off clutch 30. The right-hand end of shift inhibitor valve 77 is connected to shift control valve 66 through hydraulic pressure path 110. If for example abnormality of the device occurs or supply of drive power disappears, the current passing through linear solenoid 66a of shift control valve 66 becomes zero, causing the shift control hydraulic pressure that is supplied to hydraulic fluid path 110 to be made the maximum.

When this maximum control hydraulic pressure is supplied to shift inhibitor valve 77 through hydraulic fluid path 110, its spool is shifted to the left, causing supply of control hydraulic pressure from moving-off clutch control valve 75 to be cut off, with the result that, instead of this, Pitot pressure from Pitot control valve 78 is supplied to moving-off clutch 30. That is, in this case, engagement control of moving-off clutch 30 is performed by the Pitot pressure. This maximum control hydraulic pressure is also supplied to shift valve 65, causing its spool to be shifted to the right, so that low hydraulic pressure for control purposes is supplied to driven-side hydraulic pressure cylinder 26, and high hydraulic pressure for control purposes is supplied to drive-side hydraulic pressure cylinder 23, causing the gear ratio to be made TOP.

Next, the various control operations in a power transmission device for a hybrid vehicle constructed as above will be described. In this power transmission device, basically, the driving force of engine E is changed in transmission ratio by means of forwards/reverse changeover mechanism 10 and infinitely variable gear-change mechanism 20 and effects running drive by being transmitted from moving-off clutch 30 to the vehicle wheels through final drive and driven gears 32 and 33, differential mechanism 34, and axle shafts 35 etc. That is, when moving off, drive assistance is effected by means of first motor generator 1 and during deceleration energy regeneration is performed (battery 51 is charged) by operating first motor generator 1 as a generator.

Furthermore, when the vehicle is stationary or in a condition in which the vehicle is running at comparatively high speed, control is effected to temporarily stop the engine E with the aim of improving fuel consumption. When the engine is thus temporarily stopped during vehicle running, control is exercised to continue running by driving vehicle wheels 36 by driving second motor generator 50. When this happens, generation of entrainment torque on the engine side from forwards/reverse changeover mechanism 10 is prevented by releasing both forwards clutch 14 and reverse brake 15. On the other hand, moving-off clutch 30 is put into a lightly engaged condition such as to transmit just the torque necessary for no-load rotary drive of infinitely variable gear-change mechanism 20; control is performed to set the gear ratio of the infinitely variable gear-change mechanism 20 to match the current driving conditions, by control of the hydraulic pressure supplied to the drive- and driven-side hydraulic pressure cylinders 23, 26 in the infinitely variable gear-change mechanism 20 that is thus performing no-load rotary drive.

Figure 6:
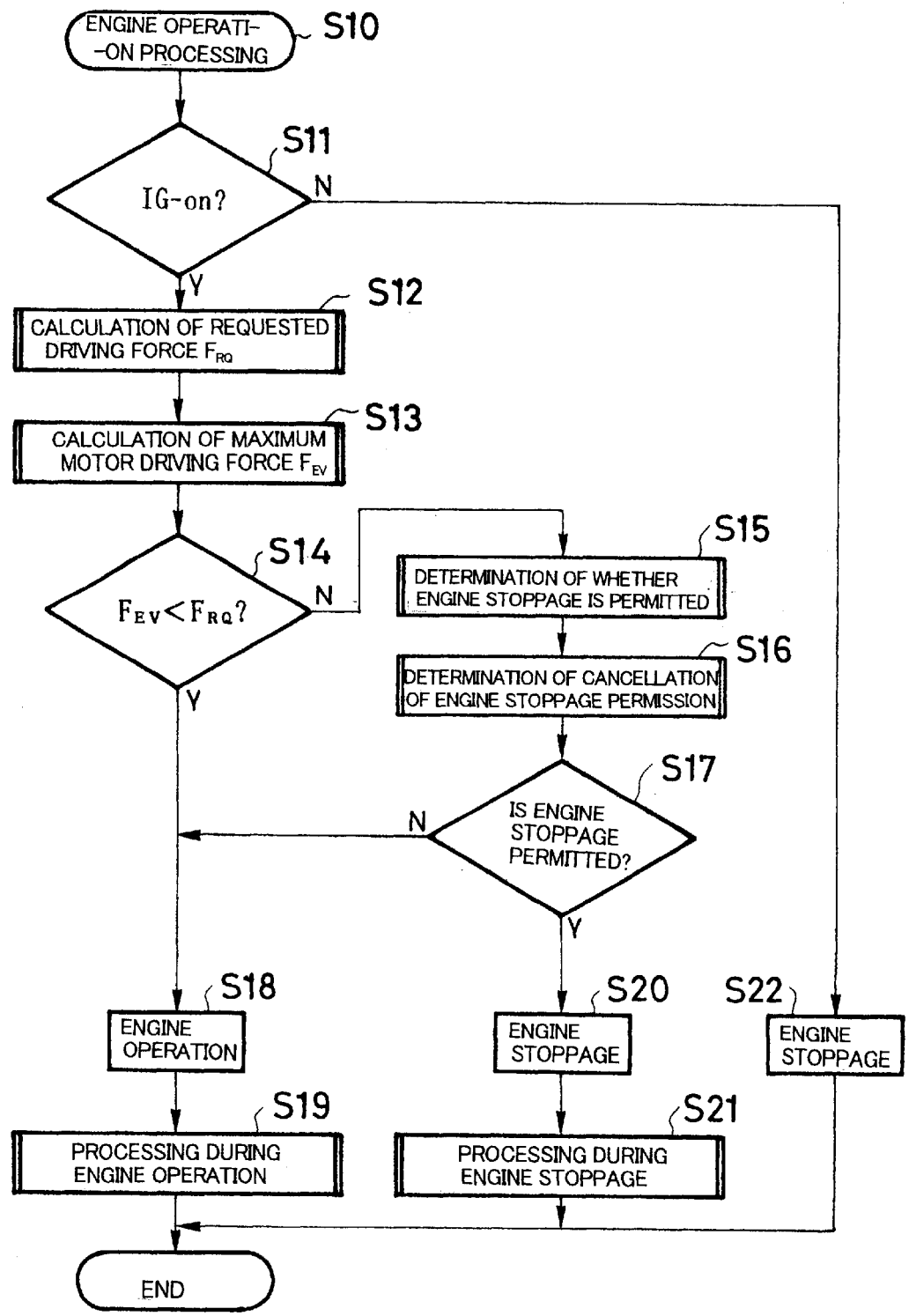
FIG. 6 is a flowchart illustrating the details of running drive control with the above power transmission device.

The details of running drive as above are described below with reference to FIG. 6 to FIG. 18. First of all, FIG. 6 shows the engine operation processing control flow S10 in which it is ascertained whether engine operation is to be continued or temporarily stopped. In this control process, in step S11 it is ascertained whether the ignition switch is ON or not and if this is OFF, the engine is stopped (step S22). When the ignition switch is turned ON, processing advances to steps S12 and S13, the requested driving force $F_{RQ}$ requested by the driver is calculated and the maximum motor driving force $F_{EV}$ which is the maximum driving force that is then capable of being output by the second motor generator 50 is calculated.

Figure 7:
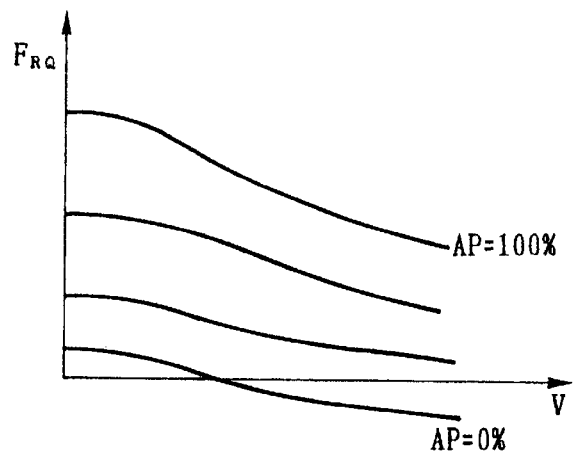
FIG. 7 is a graph showing the relationship of the requested drive force $F_{RQ}$ used in the above running drive control with vehicle speed V and degree of opening of the accelerator AP.

In the calculation of the requested driving force $F_{RQ}$, first of all it is ascertained whether the gear stick is in the drive range or not and if it is not in the drive range requested driving force $F_{RQ}=0$ is set. On the other hand, if it is in the drive range, the requested driving force $F_{RQ}$ is set in accordance with the vehicle speed V and degree of accelerator opening AP (%). In order to do this, as shown in FIG. 7, the requested driving force $F_{RQ}$ is found beforehand and set in accordance with the vehicle speed V and degree of accelerator opening AP (%) so that the requested driving force $F_{RQ}$ corresponding to the current actual vehicle speed V and degree of accelerator opening AP (amount of depression of the accelerator pedal) can then be read and set from FIG. 7. It should be noted that, as can be seen from FIG. 7, the requested driving force $F_{RQ}$ becomes smaller as the vehicle speed V increases and becomes larger as the degree of accelerator opening AP increases. In this Figure, degree of accelerator opening AP=100% means the condition in which the accelerator is fully open (WOT), and degree of accelerator opening AP=0% means the condition in which the accelerator is fully closed.

Figure 8:
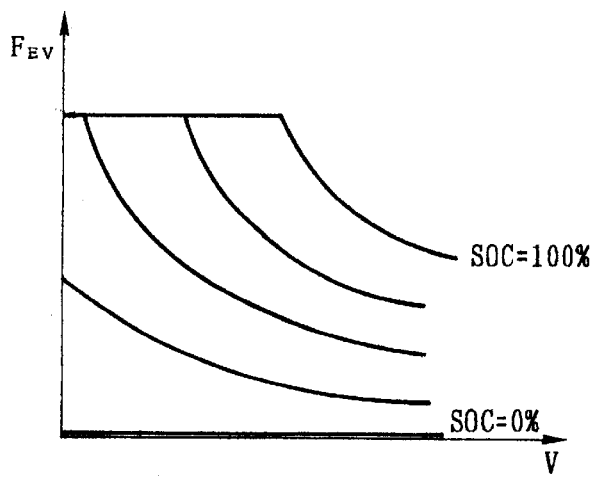
FIG. 8 is a graph showing the relationship between the maximum motor drive force $F_{EV}$ in the above running drive control with vehicle speed V and remaining battery capacity SOC.

Also, the maximum motor driving force $F_{EV}$ is found from the remaining capacity SOC of battery 51 and the vehicle speed V To do this, as shown in FIG. 8, the maximum motor driving force $F_{EV}$ is found beforehand and set in accordance with the vehicle speed V and remaining battery capacity SOC, so that the maximum motor driving force $F_{EV}$ can then be read and set from FIG. 8 in accordance with the actual current vehicle speed V and remaining battery capacity SOC. It should be noted that, as can be seen from FIG. 8, the maximum motor driving force $F_{EV}$ becomes smaller as the vehicle speed V increases and becomes larger as the remaining battery capacity SOC increases.

Next, in step S14, the thus-calculated requested driving force $F_{RQ}$ and the maximum motor driving force $F_{EV}$ are compared, and, if $F_{EV} < F_{RQ}$, engine operation control is selected and engine operation processing control is performed (steps S18, S19). That is, if the requested driving force $F_{RQ}$ is greater than the maximum motor driving force $F_{EV}$, since sufficient drive cannot be provided by the second motor generator 50, drive is performed by engine E.

Contrariwise, if $F_{EV} \geq F_{RQ}$, drive running can indeed be performed by second motor generator 50, so in step S15 a decision is made as to whether the engine can be temporarily stopped or not. Further, in step S16, a decision is made as to whether or not the engine should be released from a condition in which permission has been given for it to be temporarily stopped i.e. whether the engine should be restarted or not. If permission has not been given for the engine to be temporarily stopped or if permission for the engine to be temporarily stopped has been canceled, processing advances from step S17 to steps S18 and S19, and processing control during engine operation is performed as described above. On the other hand, if temporary engine stoppage is possible, processing advances to steps S20 and S21, the engine is stopped and engine stoppage processing is performed.

In the above control flow, the processing control during engine operation in step S19 is the control that was conventionally carried out: for example, in the forward movement range, forwards clutch 14 is engaged and engagement control of moving-off clutch 30 is performed, causing the vehicle to move off; and after it has moved off control for running the vehicle is exercised by gear ratio control effected by infinitely variable gear-change mechanism 20 in accordance with driving conditions. Since such control is control that was typically carried out conventionally, a detailed description thereof will here be omitted.

Hereinbelow control whereby the engine is temporarily stopped will be described. However, first of all, the engine temporary stoppage decision control S15 in the aforementioned engine operation processing flow S10 will be described with reference to FIG. 9. In this control flow, first of all, a decision is made as to whether or not the remaining battery capacity SOC is greater than a prescribed value, and if the remaining battery capacity SOC is less than the prescribed value i.e. the remaining capacity is low, processing advances to step S35 so that engine stoppage control is not carried out. When the engine is stopped, a minimum electrical power is necessary for restarting it and for during accessory units etc. during engine stoppage. The aforementioned prescribed value is a value established for judging whether such a margin exists or not. This value varies depending on the engine stoppage time but is set for example on the order of about 100 Wh. If on the other hand the remaining capacity is more than was prescribed, processing advances to step S32, where a decision is made as to whether or not the brake negative pressure (i.e. the negative pressure in vacuum tank 6 shown in FIG. 1) is below a prescribed value or not.

In step S32, if it is determined that the brake negative pressure exceeds a prescribed value (i.e. it is ascertained that the brake negative pressure is insufficient), since this means that safe braking cannot be performed because a sufficient boosting action is not being obtained from brake booster 7, processing advances to step S35 so that engine stoppage control is not carried out and engine operation is continued to allow booster negative pressure to be accumulated. This prescribed value varies depending on the capacity of vacuum tank 6 but is set for example at about 250 mmHg. If the brake negative pressure is below the prescribed value so that a sufficient boosting action is achieved by brake booster 7, processing advances to step S33, where a decision is made as to whether warm-up operation of the engine has been completed or not.

If warm-up operation has not yet been completed, completion of engine of warm-up is given priority and processing advances to step S35, causing engine operation to be continued without performing engine stoppage control. On the other hand, if warm-up operation has indeed been completed, processing advances to step S34, allowing engine stoppage. Thus, engine stoppage is only allowed if the battery has sufficient remaining capacity, sufficient brake negative pressure is stored, and warm-up operation has been completed.

Figure 10:
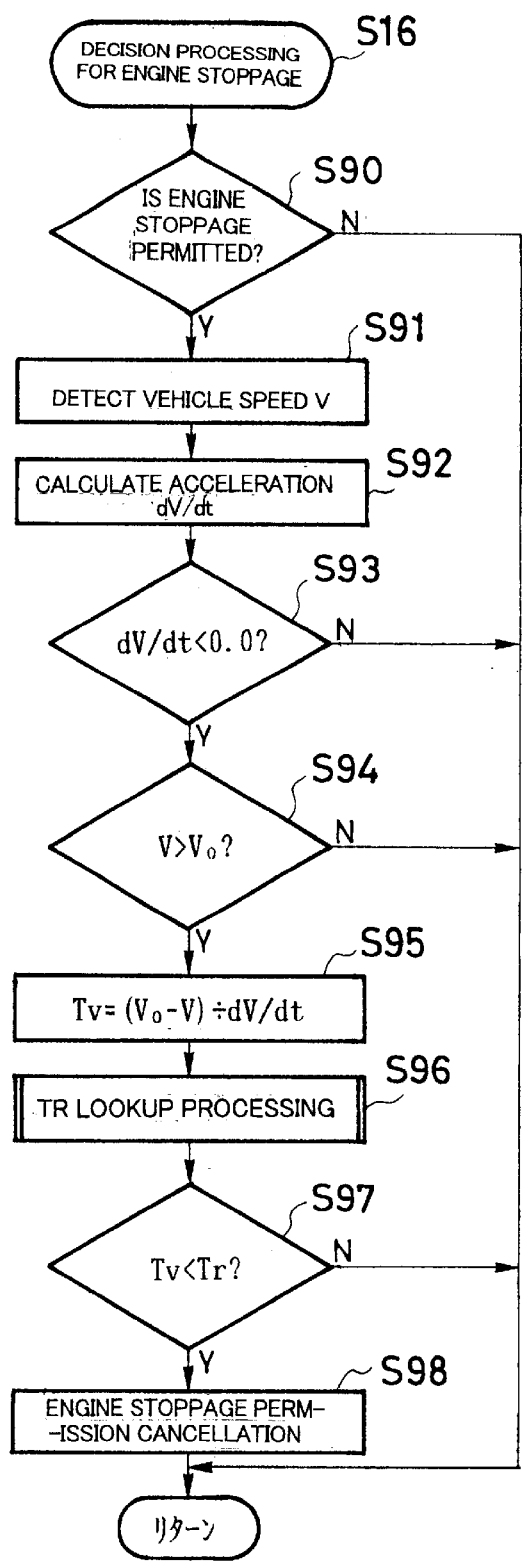
FIG. 10 is a flowchart showing the details of engine stoppage permission cancellation decision processing control in the control of FIG. 6.

Next, engine stoppage permission cancellation decision processing control S16 in the above-mentioned engine operation processing flow S10 will be described with reference to FIG. 10. In this control flow, first of all in step S90 a determination is made as to whether or not engine stoppage permission has already been given. If stoppage permission has not been given, no processing for cancellation is required and the current flow is terminated without any further processing. If engine stoppage permission has been given, processing advances to steps S91 and S92 and the vehicle speed V is detected and the degree of acceleration dV/dt is calculated. A determination is then made (step S93) as to whether or not the degree of acceleration dV/dt that has thus been calculated is a negative value i.e. of whether the vehicle is in a decelerating condition or not. If this is positive or zero (when accelerating or running at constant speed), no abrupt change in gear ratio can occur, so even if engine stoppage permission has been given, processing to cancel it is unnecessary, so the current flow terminates without further processing being undertaken.

On the other hand, if the degree of acceleration dV/dt is a negative value i.e. if the vehicle is determined to be in a decelerating condition, processing advances to step S94 and a determination is made as to whether or not the vehicle speed V is larger than a prescribed vehicle speed V0. This prescribed vehicle speed V0 is the minimum speed at which rotation of driven pulley 25 can be detected by second rotation sensor 42 when running at this prescribed vehicle speed V0 and is specifically about 5 km/h. If the vehicle speed V gets below the prescribed vehicle speed V0, rotation of the driven pulley 25 becomes too small so rapid gear-change control becomes impossible. If V≦V0 the current flow is therefore terminated without further processing.

On the other hand, if V>V0, in step S95 the requested deceleration time Tv is calculated. This requested deceleration time Tv is the time required for deceleration of vehicle speed V to the prescribed speed V0 while keeping the current rate of deceleration (negative acceleration) and is calculated by:

$$Tv=(V0-V)/(dV/dt).$$

Figure 11:
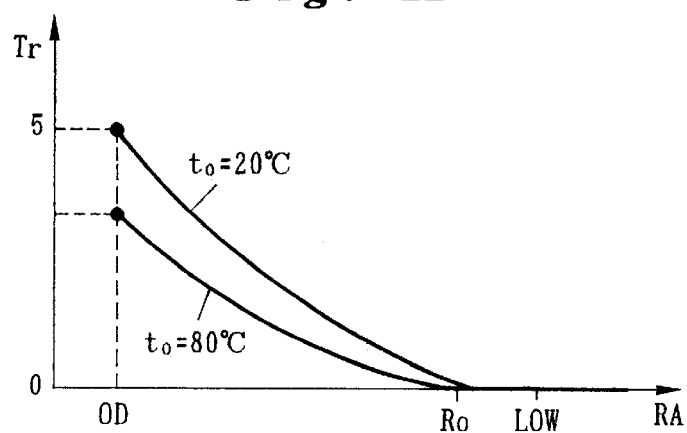
FIG. 11 is a graph showing the relationship of current gear ratio RA in the above engine stoppage permission cancellation decision processing control with gear-change mechanism fluid temperature t0 and maximum deceleration time Tr.
Figure 9:
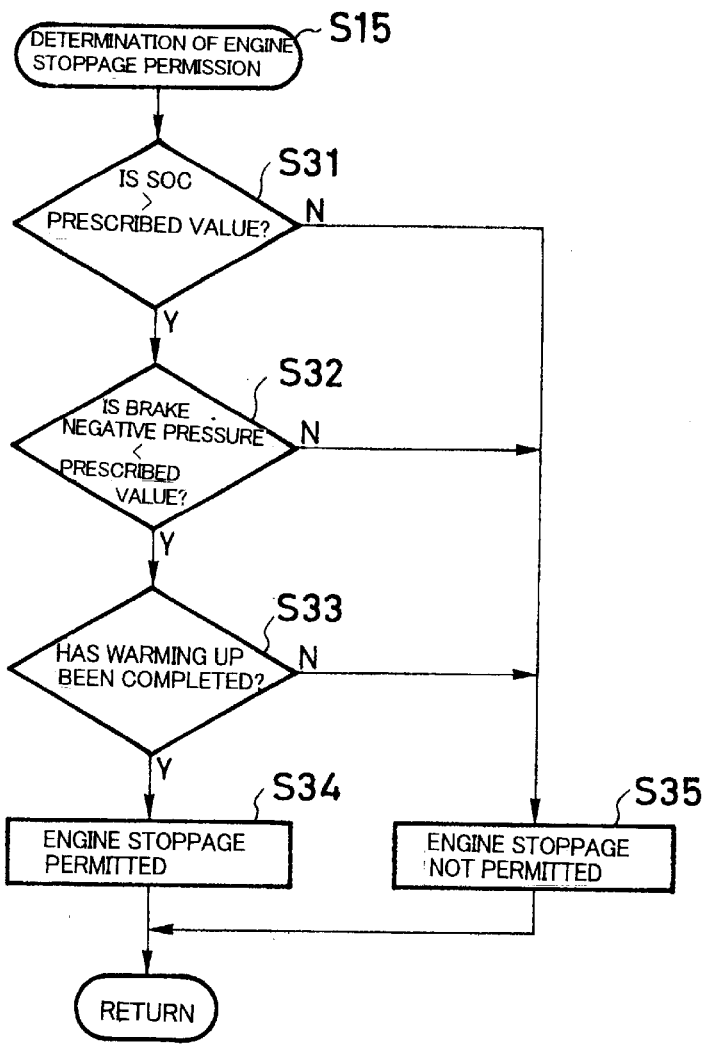
FIG. 9 is a flowchart showing the details of engine stoppage permission decision control in the control of FIG. 6.

Next, processing advances to step S96 and the maximum deceleration time Tr needed to perform gear-change from the current gear ratio RA to the prescribed gear ratio RO with the maximum rate of gear-change that is achievable using the hydraulic fluid obtained from second hydraulic pump 56 driven by electric motor for pump drive 55 is looked up. This prescribed gear ratio RO is the minimum gear ratio (on the LOW side) at which sufficient driving force can be exhibited when moving off from a vehicle stopped condition and is set as a gear ratio of about 90% or more of the maximum gear ratio (LOW) of infinitely variable gear-change mechanism 20. That is, a gear ratio close to the LOW gear ratio is set as the prescribed gear ratio on RO. As will be understood from this, the shortest gear-change time that is achievable by the hydraulic pressure from the second hydraulic pump 56, from the current gear ratio RA to the gear ratio RO at which sufficient moving-off driving force can be exhibited is the maximum deceleration time Tr. This maximum deceleration time Tr, as shown in FIG. 11, is found experimentally beforehand and set in accordance with the gear box hydraulic fluid temperature t0 and the current gear ratio RA and is found by lookup from this graph.

Next, the requested deceleration time Tv that has been found as described and the maximum deceleration time Tr are compared (step S97) and if Tv≧Tr the engine stoppage permission control is continued without alteration, but, if Tv<Tr, engine stoppage control is cancelled i.e. the engine is restarted (step S98). As can be seen from this, the requested deceleration time Tv is a value corresponding to the "requested rate of gear-change requested in accordance with the driving conditions" defined in the claims, and the maximum deceleration time is a value corresponding to the "maximum rate of gear-change obtained by hydraulic pressure supplied from the second hydraulic pump".

Figure 12A:
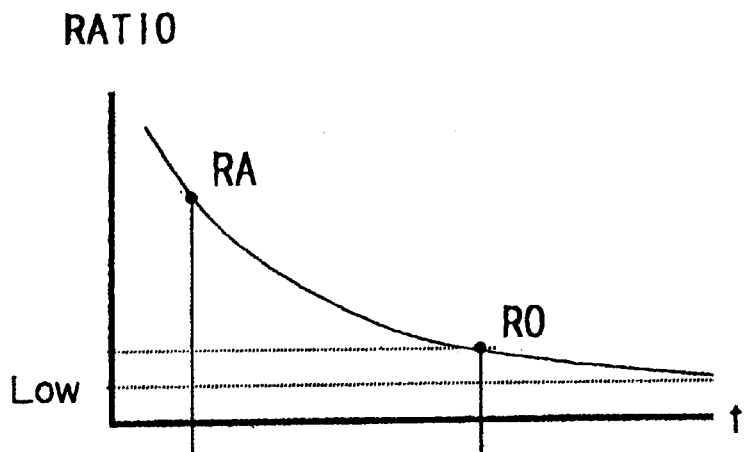
FIGS. 12A to C are graphs showing the relationship between the demanded deceleration time Tv and maximum deceleration time Tr when the gear ratio is changed from RA to RO by decelerating running.
Figure 12B:
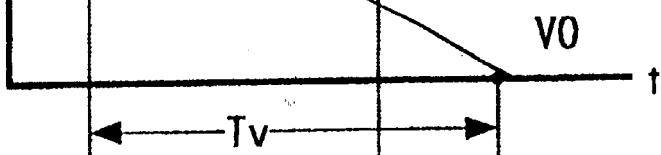

A specific description of this control will now be given with reference to FIG. 12. First of all, FIG. 12A shows the time change of gear ratio when gear-change is effected towards the LOW side with the maximum rate of gear-change achievable by means of the hydraulic pressure from the second hydraulic pump 56 during running with the current gear ratio RA, the vertical axis showing the gear ratio RATIO and the horizontal axis showing the time t. As can be seen from this figure, the gear-change time at this point is the maximum deceleration time Tr. FIGS. 12B and C show the relationship between the deceleration dV/dt and the requested deceleration time Tv requested for deceleration to the prescribed vehicle speed V0 with this deceleration when deceleration is effected by brake operation etc.

Figure 12C:
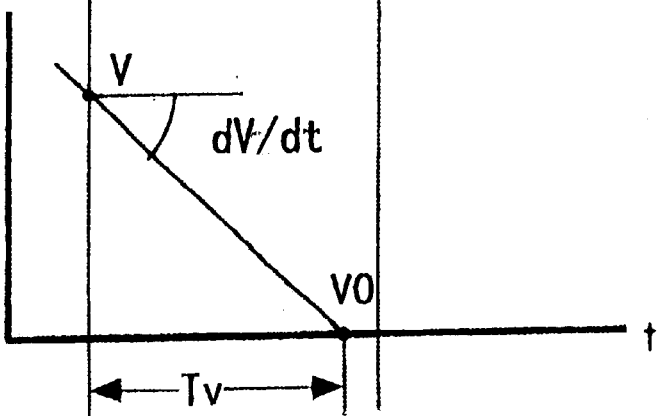

FIG. 12B shows the case where the deceleration dV/dt is comparatively small, and FIG. 12C shows the case where the deceleration dV/dt is large. In the case of the deceleration of FIG. 12B, the deceleration is comparatively gentle, so the requested deceleration time Tv is longer than the maximum deceleration time Tr and vehicle is still running at the time-point where the gear ratio is changed to the prescribed gear ratio RO. In this case, since the change of gear ratio to the prescribed gear ratio RO is effected whilst the vehicle is capable of gear change control during running, even though the vehicle is stopped in a condition with engine stoppage permission given, the necessary prescribed gear ratio RO for the next moving-off is obtained and the engine stoppage permission is therefore retained.

On the other hand, in the case of the deceleration of FIG. 12C, the requested deceleration time Tv is shorter than the maximum deceleration time Tr, and the vehicle has already stopped at the time-point where the gear ratio has changed to the prescribed gear ratio RO. In this case, since gear change to the prescribed gear ratio RO has not been effected even by the time point where gear-change control has become impossible due to stoppage of the vehicle, control is performed to cancel the engine stoppage permission. As a result, when deceleration was commenced in the condition of gear ratio RA, the engine is restarted, and the first hydraulic pump 3 is driven, so that rapid gear-change control is performed using the hydraulic fluid which is discharged thereby, so that the prescribed gear ratio RO which is required for the next moving-off can be obtained before the vehicle stops. As can be seen from this fact, if the capacity of the first hydraulic pump 3 that is driven by the engine is made sufficiently large, gear-change control can be performed without problems even though the second hydraulic pump 56 that is driven by the electric motor 55 for pump drive is made small and compact.

Figure 13:
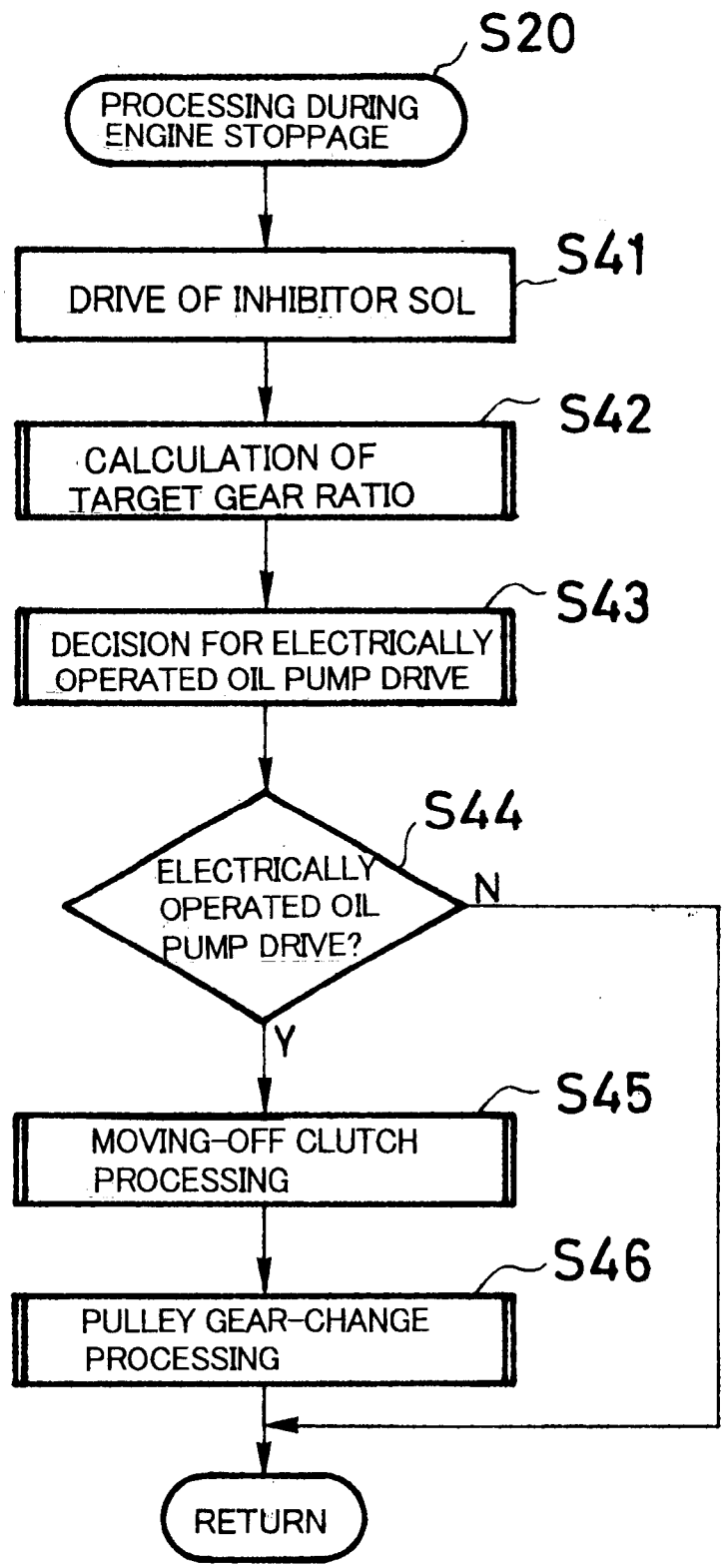
FIG. 13 is a flowchart showing the details of engine stoppage processing control in the control of FIG. 6.

The details of the processing control during engine stoppage (step S20) that is performed when engine stoppage is thus permitted are described with reference to FIG. 13. In this control process, first of all, the inhibitor solenoid valve i.e. the clutch control solenoid valve 81 (see FIG. 3) is driven (step S41). The clutch control solenoid valve 81 is a solenoid valve of normally closed type; by driving this, hydraulic fluid paths 108, 108a are connected to the drain, causing the hydraulic fluid pressure acting on the right-hand end of the forwards/reverse clutch control valve 73 to be made zero. As a result, as described above, hydraulic fluid path 107 communicates with the drain, and the line pressure to forwards clutch 14 or reverse brake 15 which was applied through manual valve 74 is cut off, putting both forwards clutch 14 and reverse brake 15 into a released condition.

The engine output shaft Es and the gear-change mechanism input shaft 21 are thereby disconnected in forwards/reverse changeover mechanism 10, with the result that the rotation on the gear-change mechanism side can no longer be transmitted from the gear-change mechanism input shaft 21 to the engine side, thereby preventing occurrence of entrainment torque on the engine side. That is, when engine E is temporarily stopped and running is performed with the vehicle wheels 36 being driven by second motor generator 50, their rotation is disconnected at the forwards/reverse changeover mechanism 10 and so cannot be transmitted to the engine side, so entrainment torque due to rotary members between the engine E and forwards/reverse changeover mechanism 10 is not generated, and the driving force of the second motor generator 50 is efficiently transmitted to the vehicle wheels 36. There is therefore no need to make the drive power of battery 51 unnecessarily large, and efficient energy regeneration can be performed when second motor generator 50 is driven by drive from vehicle wheels 36 during deceleration etc.

Figure 14:
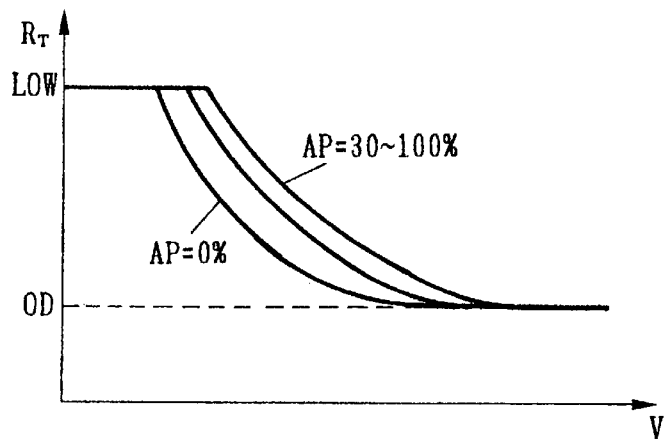
FIG. 14 is a graph showing the relationship of the target gear ratio RT calculated in the control of FIG. 13 with the vehicle speed V and degree of opening of the accelerator AP.

Next, the target gear ratio RT whilst the engine is temporarily stopped is calculated (step S42). As shown in FIG. 14, the target gear ratio RT is determined in accordance with the vehicle speed V and degree of accelerator opening (amount of depression of the accelerator pedal) AP; it is set to a value that decreases as the vehicle speed V increases and increases as the degree of accelerator opening increases. Specifically, the target gear ratio immediately prior to restarting of the engine is set such that when the requested driving force is increased by the driver gradually depressing the accelerator pedal, causing the engine to restart, the speed of engine E is about 2000 rpm when the engine is restarted and moving-off clutch 30 is engaged. On the other hand, it is set such that if the amount of depression of the accelerator pedal is comparatively small and the requested driving force is also not large, the speed of rotation of engine E is about 1200 to 1500 rpm when the engine is restarted and moving-off clutch 30 is engaged.

Figure 15:
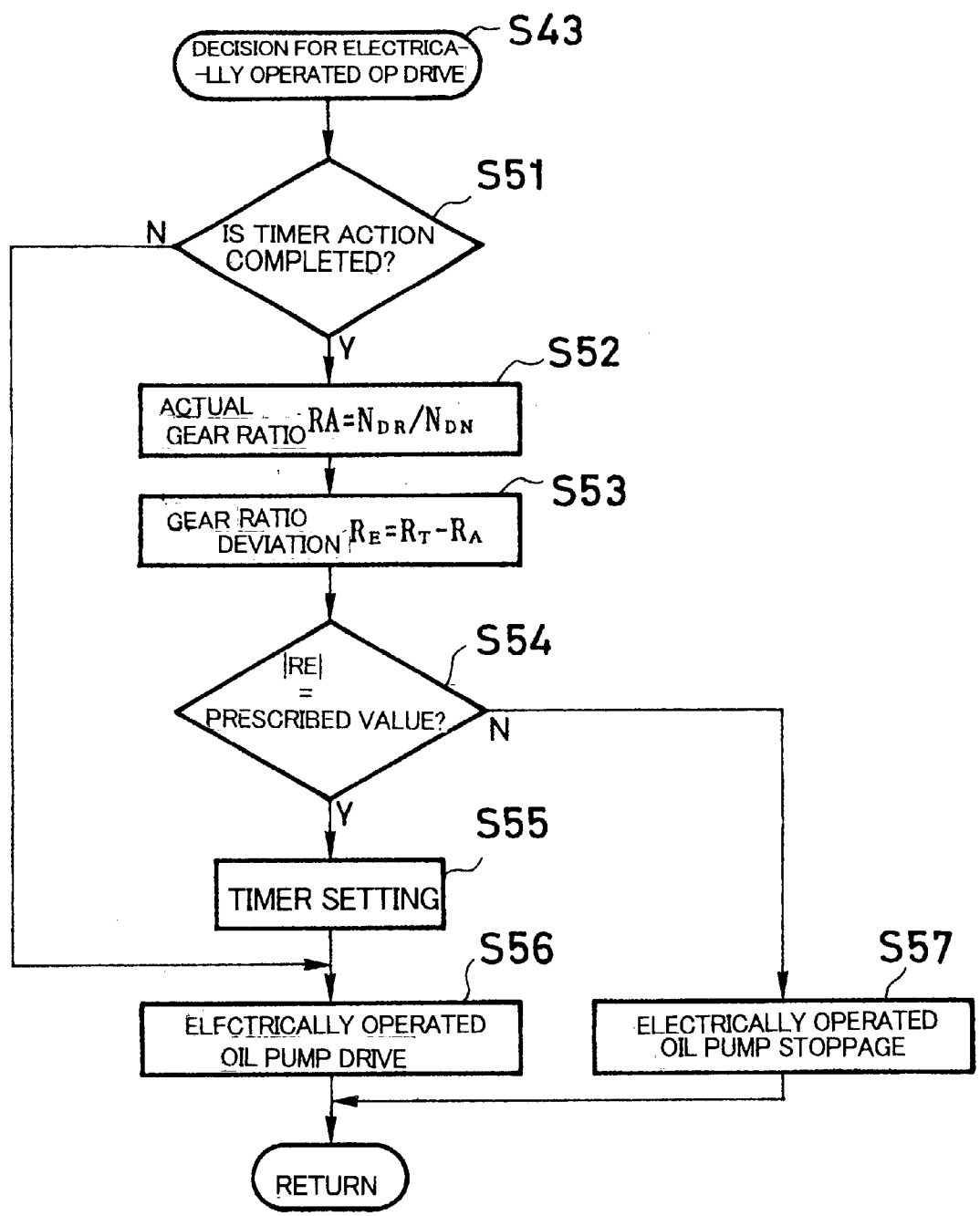
FIG. 15 is a flowchart showing the details of electrically driven oil pump drive decision control in the control of FIG. 13.

When the target gear ratio is calculated in this way in step S42, it is ascertained (step S43) whether or not it is necessary to drive second hydraulic pump (electrically operated oil pump) 56 in accordance with this target gear ratio. The details of this decision control are shown in FIG. 15; in this process, first of all, a decision is made (step S51) as to whether or not timer action has terminated. It should be noted that the timer is in a terminated condition in the initial condition. When timer action terminates, processing advances to step S52, and the actual gear ratio RA (=NDR/NDN) is calculated. NDR is the rotational speed of the drive pulley 22 detected by first rotation sensor 41 and NDN is the rotational speed of driven pulley 25 detected by second rotation sensor 42.

Next, processing advances to step S53, and the gear ratio deviation RE (=RT−RA) is calculated. If the absolute value of the gear ratio deviation RE is larger than a prescribed value i.e. if the gear ratio deviation RE is large, gear-change control is necessary, so second hydraulic pump 56 is driven by electric motor 55 for pump drive. At this point, in step S55, the timer is set, causing second hydraulic pump 56 to be temporarily driven, whereupon drive thereof is continued for the time sent by the timer. By employing a timer in this way, the frequency of turning electric motor 55 for pump drive on and off is reduced, improving the durability of the switching elements (relays) that perform the on/off control. On the other hand, if the absolute value of the gear ratio or deviation RE is smaller than the prescribed value, gear-change is unnecessary, so drive of second hydraulic pump 56 is stopped (step S57).

Figure 16:
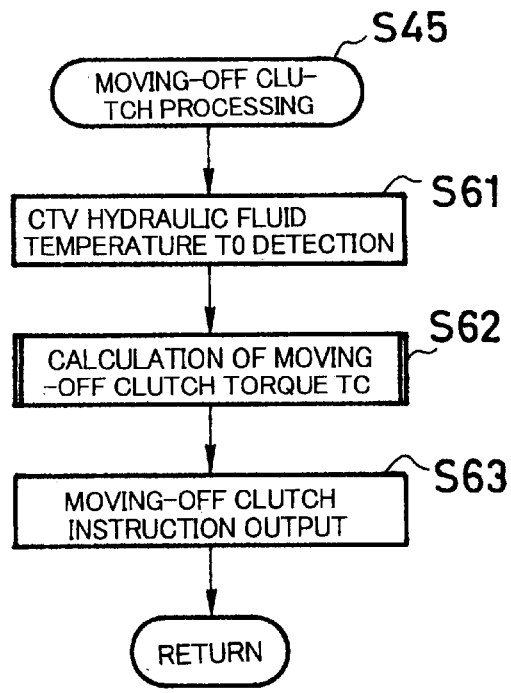
FIG. 16 is a flowchart showing the details of moving-off clutch processing control in the control of FIG. 13.
Figure 17:
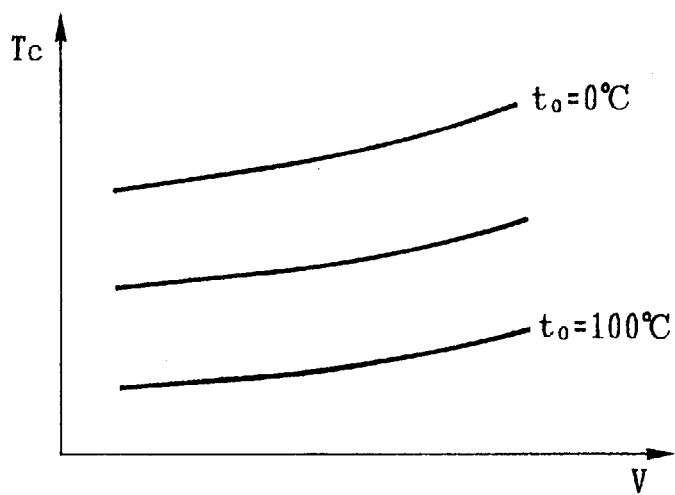
FIG. 17 is a graph showing the relationship of moving-off clutch torque Tc with vehicle speed V and gear-change mechanism fluid temperature t0 in the control of FIG. 16.

In this way, in step S43, a decision is made regarding driving of the electrically operated oil pump i.e. second hydraulic pump 56 and if this is driven processing advances from step S44 to step S45 and moving-off clutch control processing is performed. The details of this control process are shown in FIG. 16; in this control process, first of all, the gear-change mechanism hydraulic fluid temperature t0 is detected (step S61). Next, the moving-off clutch engagement torque Tc is calculated, and an instruction signal is output to control the operation of moving-off clutch control valve 75 that sets the hydraulic pressure that is supplied to the moving-off clutch 30, such that this engagement torque Tc is obtained. It should be noted that this moving-off clutch engagement torque Tc is set as shown in FIG. 17 in accordance with the gear-change mechanism hydraulic fluid temperature t0 and vehicle speed V When the vehicle is running in a condition with the engine stopped, the infinitely variable gear-change mechanism 20 must be rotated under no load such that a gear ratio is obtained matching the current running condition (driving condition). The moving-off clutch engagement torque Tc is the torque value that is required to transmit the necessary driving force for no-load rotation of infinitely variable gear-change mechanism 20 in this way; torque Tc is set as shown in FIG. 17 such that it increases as the hydraulic fluid temperature to becomes lower, and increases as the vehicle speed V becomes larger.

Figure 18:
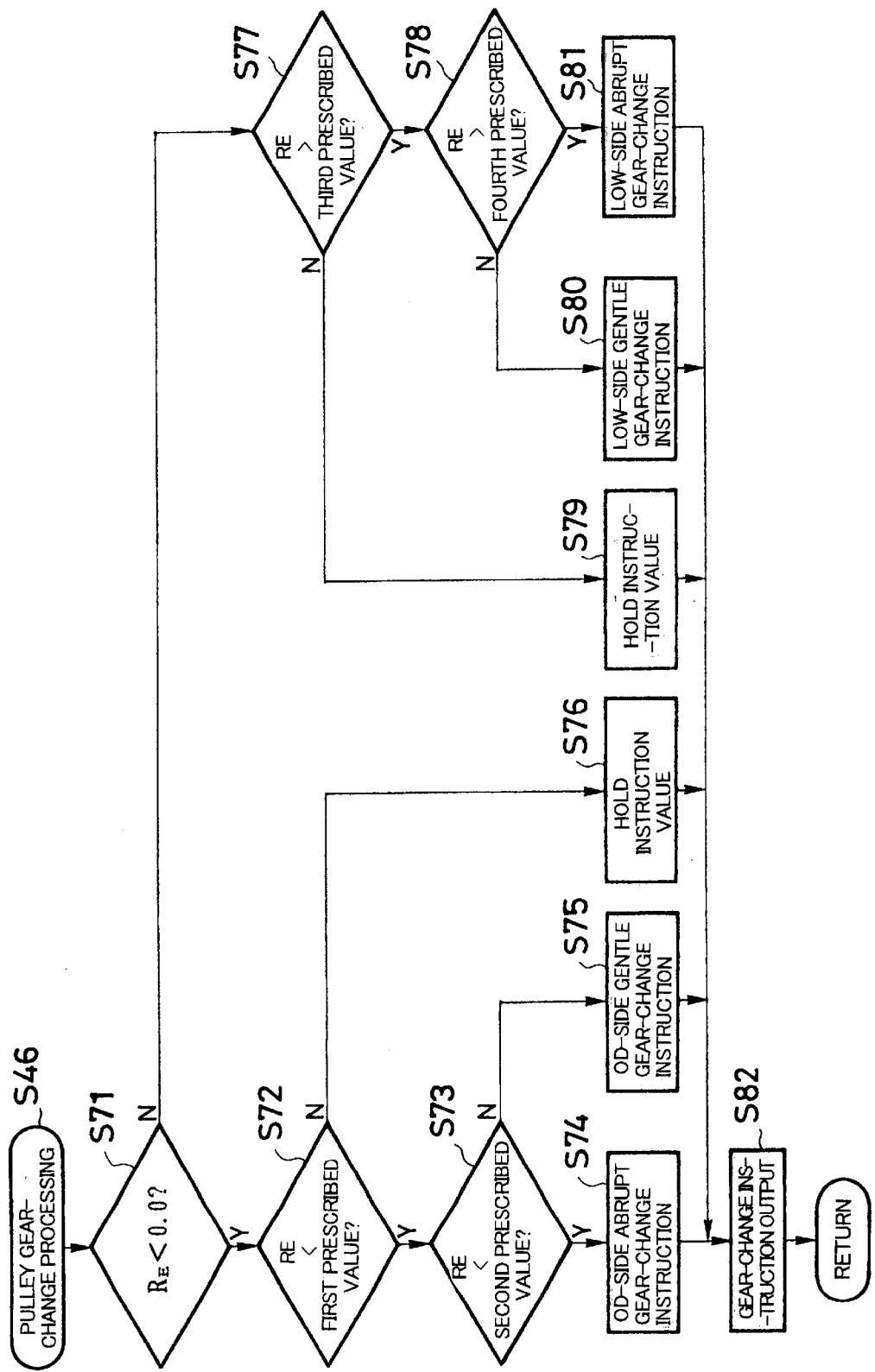
FIG. 18 is a flowchart showing the details of pulley gear ratio processing control in the control of FIG. 13.

Next, processing advances from step S45 to step S46, so that pulley gear-change processing i.e. gear-change processing control in infinitely variable gear-change mechanism 20 is performed. The details of this control process are shown in FIG. 18; in this control process, first of all, a determination is made as to whether the gear ratio deviation RE is positive or negative (step S71). If the gear ratio deviation RE is negative i.e. the actual gear ratio RA is larger than the target gear ratio RT, it is necessary to make the gear ratio smaller (towards the OD (overdrive) side); contrariwise, if the gear ratio deviation RE is positive, the actual gear ratio RA is smaller than the target gear ratio RT so it is necessary to make the gear ratio larger (towards the LOW side).

In order to achieve this, if the gear ratio deviation RE is negative, processing advances to step S72, in which a comparison is made of the gear ratio deviation RE and a first prescribed value which is a negative value whose absolute value is comparatively small. If the gear ratio deviation RE is larger than the first prescribed value (close to zero) it is concluded that there is no need for a gear change, and the gear-change instruction value of the previous occasion is held (step S76). If the gear ratio deviation RE is smaller than the first prescribed value (if it is a negative value of larger absolute value), processing advances to step S73, in which the gear ratio deviation RE is compared with a second prescribed value which is a negative value whose absolute value is comparatively larger. If the gear ratio deviation RE is larger than the second prescribed value (close to zero), it is concluded that a gentle gear-change towards the OD side is necessary, and an OD-side gentle gear-change instruction value is set as the gear-change instruction value (step S75). On the other hand, if the gear ratio deviation RE is smaller than the second prescribed value (if it is a negative value of larger absolute value), it is concluded that an abrupt gear-change towards the OD side is necessary, and an OD-side abrupt gear-change instruction value is set as the gear-change instruction value (step S74).

On the other hand, if in step S71 it is determined that the gear ratio deviation is a positive value, processing advances to step S77, in which the gear ratio deviation RE and a third prescribed value which is a positive value whose absolute value is comparatively small are compared. If the gear ratio deviation RE is smaller than the third prescribed value (close to zero), it is concluded that there is no need for a gear change, and the gear-change instruction value of the previous occasion is held (step S79). If the gear ratio deviation RE is larger than the third prescribed value, processing advances to step S78, where the gear ratio deviation RE is compared with a fourth prescribed value which is a positive value and whose absolute value is comparatively large. If the gear ratio deviation RE is smaller than the fourth prescribed value, it is concluded that a gentle gear-change towards the LOW side is necessary, and a LOW-side gentle gear-change instruction value is set as the gear-change instruction value (step S80). On the other hand, if the gear ratio deviation RE is larger than the fourth prescribed value, it is concluded that an abrupt gear-change to the LOW side is necessary, and a LOW-side abrupt gear-change instruction value is set as the gear-change construction value (step S81).

Operation of the shift control valve 66 is controlled in accordance with the gear-change instruction value that is thus set, so that control of supply of high-pressure and low-pressure control hydraulic pressure to the drive- and driven-side hydraulic pressure cylinders 23 and 26 is effected by shift valve 65 and gear-change control is thereby performed corresponding to the gear-change instruction value.

The details of various types of control when engine temporary stoppage was performed are described above. Such control features in particular: when the engine is temporarily stopped, releasing the forwards clutch 14 and reverse brake 15 in the forwards/reverse changeover mechanism 10 so as to disconnect the linkage with the engine side; restriction of drive of the second hydraulic pump 56 by the electric motor 55 for pump drive purposes when the gear ratio deviation has become large; and no-load rotary drive of the infinitely variable gear-change mechanism 20 by light engagement of moving-off clutch 30 when the gear ratio deviation has become large and performance of gear ratio control such that a target gear ratio is obtained corresponding to the current driving conditions.

In this way, the drive efficiency of the second motor generator 50 and/or the energy regeneration efficiency when this acts as a generator by being driven by the vehicle wheels are improved since, when the engine is temporarily stopped and running drive is performed using the second motor generator 50, generation of rotary entrainment torque on the engine side of the forwards/reverse changeover mechanism 10 is eliminated. Also, gear-change control of the infinitely variable gear-change mechanism during driving by the second motor generator 50 is unnecessary, but, since gear-change control is meanwhile performed such that a gear ratio is obtained matching the driving conditions, there is no possibility of the engine speed running away when the engine is restarted, so a smooth transition to engine drive control can be achieved. Also, since, during such an gear-change control of the infinitely variable gear-change mechanism 20, the infinitely variable gear-change mechanism 20 merely performs gear-change control under a no-load operating condition, there is the advantage that the hydraulic pressure for effecting gear-change can be a low pressure, so that only a small amount of gear-change control energy is required. Likewise, the moving-off clutch 30 need only be weakly engaged to an extent such as to permit transmission of the small torque needed for no-load rotation of infinitely variable gear-change mechanism 20, so the engagement control energy of the moving-off clutch 30 can also be made small.

It should be noted that, although, in the above, a power transmission device using a metal V-belt type infinitely variable gear-change mechanism was described as an example, the infinitely variable gear-change mechanism is not restricted to being of such a type. Also, although a construction was adopted whereby, during temporary stoppage of the engine, the engine side and the infinitely variable gear-change mechanism side were disconnected by means of the forwards/reverse changeover mechanism (that is, the engagement/disengagement control means of the claims is constituted by the forwards clutch and reverse brake of the forwards/reverse changeover mechanism), an arrangement could be adopted whereby a separate clutch is arranged on the input shaft of the infinitely variable gear-change mechanism, the engagement/disengagement control means of the claims being constituted by this clutch, this clutch being disengaged during temporary engine stoppage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2000-007339 filed on Jan. 17, 2000 and Japanese Patent Application No. 2000-014406 filed on Jan. 24, 200 which are incorporated herein by reference.

What is claimed is:

1. A hybrid vehicle control device comprising: an engine that is capable of temporary stoppage control in a prescribed operating condition, an infinitely variable gear-change mechanism connected to the output shaft of said engine and whereby the output rotation thereof is subjected to infinitely variable change of gear ratio, a driving force transmission system that transmits the output of said infinitely variable gear-change mechanism to the drive wheels, and an electrically driven motor capable of driving said vehicle wheels and arranged parallel with said engine, further comprising:

a first hydraulic pump that is driven by said engine; and a second hydraulic pump that is driven by an electric motor for pump drive, wherein during running with said engine stopped in said prescribed operating condition, gear-change control is performed by driving said second hydraulic pump by said electric motor for pump drive such that the gear ratio of said infinitely variable gear-change mechanism is made to have a value matching the current operating condition, by using hydraulic pressure obtained from said second hydraulic pump.

2. The hybrid vehicle control device according to claim 1 wherein engagement/disengagement means are provided that perform engagement/disengagement control using hydraulic force and that are arranged so as to be capable of effecting engagement/disengagement between the output shaft of said engine and an input member of said infinitely variable gear-change mechanism, said electrically driven motor is connected to said driving force transmission system and is constituted so as to be capable of driving said drive wheels, gear-change control by said infinitely variable gear-change mechanism being arranged to be performed using hydraulic fluid from said first hydraulic pump when the vehicle is being driven while running by said engine being driven, by transmission of output of the said engine to said drive wheels by engagement action thereof, wherein is provided a hydraulic pressure supply changeover control valve that changes over control of supply of working hydraulic pressure in respect of said engagement/disengagement control means; and wherein when, in said prescribed operating condition, said engine is stopped and the vehicle is being run by said drive wheels being driven by said electrically driven motor, said engagement/disengagement control means are released by stopping supply of working hydraulic pressure to said engagement/disengagement control means by said hydraulic pressure supply changeover control valve, said second hydraulic pressure pump being driven by said electric motor for pump drive and gear-change control being performed such that the gear ratio of said infinitely variable gear-change mechanism is made to have a value corresponding to the current operating conditions, using the hydraulic pressure obtained from said second hydraulic pump.

3. The hybrid vehicle control device according to claim 1 wherein, when a large gear-change request is generated that cannot be coped with by gear-change control by the hydraulic pressure obtained from said second pump, said engine is started to drive said first hydraulic pump and the hydraulic pressure obtained from said first hydraulic pump is used for gear-change control.

4. The hybrid vehicle control device according to claim 3 further comprising means for discrimination that compare the requested rate of gear-change requested in accordance with driving conditions with the maximum rate of gear-change that can be obtained by hydraulic pressure supplied from said second hydraulic pump, and wherein, if it is concluded by said means for discrimination that said requested rate of gear-change is larger than said maximum rate of gear-change, said first hydraulic pump is caused to be driven by starting said engine.

* * * * *